United States Patent
Saarinen et al.

(10) Patent No.: US 9,655,063 B2
(45) Date of Patent: May 16, 2017

(54) POWER CONTROL

(75) Inventors: Marko Pentti Mikael Saarinen, Oulu (FI); George-Raffael Janczyk, Augsburg (DE)

(73) Assignee: Nokia Solutions and Networks Oy, Espoo (FI)

( * ) Notice: Subject to any disclaimer, the term of this patent is extended or adjusted under 35 U.S.C. 154(b) by 73 days.

(21) Appl. No.: 14/380,410

(22) PCT Filed: Feb. 24, 2012

(86) PCT No.: PCT/EP2012/053158
§ 371 (c)(1),
(2), (4) Date: Aug. 22, 2014

(87) PCT Pub. No.: WO2013/123999
PCT Pub. Date: Aug. 29, 2013

(65) Prior Publication Data
US 2014/0376488 A1 Dec. 25, 2014

(51) Int. Cl.
*H04W 52/32* (2009.01)
*H04W 52/00* (2009.01)
*H04W 52/34* (2009.01)

(52) U.S. Cl.
CPC ......... *H04W 52/325* (2013.01); *H04W 52/32* (2013.01); *H04W 52/00* (2013.01); *H04W 52/346* (2013.01)

(58) Field of Classification Search
CPC . H04W 52/32; H04W 52/325; H04W 52/346; H04W 52/143; H04W 52/36;
(Continued)

(56) References Cited

U.S. PATENT DOCUMENTS

| 2003/0100329 A1 | 5/2003 | Kwon et al. ............... 455/522 |
| 2009/0318183 A1* | 12/2009 | Hugl ..................... H04L 5/0023 455/522 |
| 2013/0003663 A1* | 1/2013 | Blankenship ......... H04L 5/0053 370/329 |

FOREIGN PATENT DOCUMENTS

EP    2 129 139 A1    12/2009

OTHER PUBLICATIONS

3GPP TS36.213 V10.4.0 (Dec. 2011), "3$^{rd}$ Generation Partnership Project; Technical Specification Group Radio Access Network; Evolved Universal Terrestrial Radio Access (E-UTRA); Physical layer procedures (Release 10)", 125 pgs.

* cited by examiner

*Primary Examiner* — Jae Y Lee
*Assistant Examiner* — Aixa Guadalupe-Cruz
(74) *Attorney, Agent, or Firm* — Harrington & Smith

(57) ABSTRACT

The invention relates to an apparatus including at least one processor and at least one memory including a computer program code, the at least one memory and the computer program code configured to, with the at least one processor, cause the apparatus at least to: determine usable power for a physical downlink control channel information unit based on resource consumption and available power resources, and adjust the usable power orthogonal frequency division multiplexed symbol-wise in such a manner that the available power resources are not exceeded or that exceeding is given to physical downlink control channel information units according to hierarchy of needs or that the exceeding is evenly distributed over the physical downlink control channel information units.

20 Claims, 1 Drawing Sheet

POWER CONTROL

FIELD

The invention relates to apparatuses, methods, systems, computer programs, computer program products and computer-readable media.

BACKGROUND

The following description of background art may include in-sights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

A physical downlink control channel according to the long term evolution (LTE) or long term evolution advanced (LTE-Advanced) standard is designed to carry control information for the downlink and/or uplink transmissions. The physical downlink control channel may be transmitted on an aggregation of one or several consecutive control channel elements (CCEs) which may be combined in a predetermined manner to provide different coding rates.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: determine usable power for a physical downlink control channel information unit based on resource consumption and available power resources, and adjust the usable power orthogonal frequency division multiplexed symbol-wise in such a manner that the available power resources are not exceeded or that exceeding is given to physical downlink control channel information units according to hierarchy of needs or that the exceeding is evenly distributed over the physical downlink control channel information units.

According to yet another aspect of the present invention, there is provided a method comprising: determining usable power for a physical downlink control channel information unit based on resource consumption and available power resources, and adjusting the usable power orthogonal frequency division multiplexed symbol-wise in such a manner that the available power resources are not exceeded or that exceeding is given to physical downlink control channel information units according to hierarchy of needs or that the exceeding is evenly distributed over the physical downlink control channel information units.

According to yet another aspect of the present invention, there is provided an apparatus comprising: means for determining usable power for a physical downlink control channel information unit based on resource consumption and available power resources, and means for adjusting the usable power orthogonal frequency division multiplexed symbol-wise in such a manner that the available power resources are not exceeded or that exceeding is given to physical downlink control channel information units according to hierarchy of needs or that the exceeding is evenly distributed over the physical downlink control channel information units.

According to yet another aspect of the present invention, there is provided a computer program embodied on a computer-readable storage medium, the computer program comprising program code for controlling a process to execute a process, the process comprising: determining usable power for a physical downlink control channel information unit based on resource consumption and available power resources, and adjusting the usable power orthogonal frequency division multiplexed symbol-wise in such a manner that the available power resources are not exceeded or that exceeding is given to physical downlink control channel information units according to hierarchy of needs or that the exceeding is evenly distributed over the physical downlink control channel information units.

LIST OF DRAWINGS

Some embodiments of the present invention are described below, by way of example only, with reference to the accompanying drawings, in which FIG. 1 illustrates examples of systems;

DESCRIPTION OF SOME EMBODIMENTS

Figure 1:
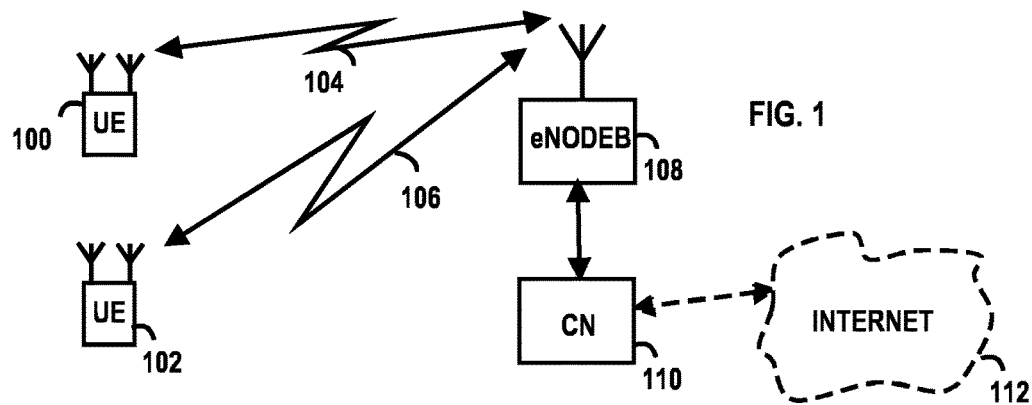

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, as well as to any network element, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on long term evolution (LTE), that is based on orthogonal frequency multiplexed access (OFDMA) in a downlink and a single-carrier frequency-division multiple access (SC-FDMA) in an uplink, without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution advanced (LTE-A,), global system for mobile communication (GSM), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, and mobile ad-hoc networks (MANETs).

In an orthogonal frequency division multiplexing (OFDM) system, the available spectrum is divided into multiple orthogonal sub-carriers. In OFDM systems, the available bandwidth is divided into narrower sub-carriers and data is transmitted in parallel streams. Each OFDM symbol is a combination of signals on each of the subcarriers. Further, each OFDM symbol is preceded by a cyclic prefix (CP), which is used to decrease Inter-Symbol Interference.

Single-carrier FDMA (SC-FDMA) is a frequency-division multiple access scheme. The SC-FDMA produces a single-carrier transmission signal, in contrast to OFDMA which is a multi-carrier transmission scheme. Unlike in OFDM, SC-FDMA subcarriers are not independently modulated.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

FIG. 1 shows a part of a radio access network based on E-UTRA, LTE, or LTE-Advanced (LTE-A).

FIG. 1 shows user devices 100 and 102 configured to be in a wireless connection on one or more communication channels 104 and 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to as a base station, an access point or any other type of interfacing device including a relay station capable of operating in a wireless environment. Typically, a (e)NodeB ("e" stands for evolved) needs to know channel quality of each user device and/or the preferred precoding matrices (and/or other multiple input-multiple output (MIMO) specific feedback information, such as channel quantization) over the allocated sub-bands to schedule downlink transmissions to user devices. Such required information is usually signalled to the (e)NodeB by using up-link signalling.

The (e)NodeB includes transceivers, for example. From the transceivers of the (e)NodeB, a connection is provided to an antenna unit that establishes bi-directional radio links to user devices. The antenna unit may comprise a plurality of antennas or antenna elements. The (e)NodeB is further connected to core network 110 (CN). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc. The mobility management entity is a control element in an evolved packet core (EPC).

A communications system typically comprises more than one (e)NodeB in which case the (e)NodeBs may also be configured to communicate with one another over links, wired or wireless, designed for the purpose. These links may be used for signalling purposes.

The communication system is also able to communicate with other networks, such as a public switched telephone network or the Internet 112. The communication network may also be able to support the usage of cloud services. It should be appreciated that (e)NodeBs or their functionalities may be implemented by using any node, host, server or access point etc. entity suitable for such a usage.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM, some examples are a full-size SIM, mini-SIM, micro-SIM and embedded-SIM), including, but not limited to, the following types of devices: a mobile station (mobile phone), smartphone, personal digital assistant (PDA), plug-in data modem (such as a universal serial bus, USB stick), handset, device using a wireless modem (alarm or measurement device, etc.), laptop and/or touch screen computer, tablet, game console, notebook, and multimedia device.

The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeBs of FIG. 1 may provide any kind of these cells. A cellular radio system may be implemented as a multilayer network including several kinds of cells and some of the cells may belong to different radio access technology layers. Typically, in multilayer networks, one node B provides one kind of a cell or cells, and thus a plurality of (e) Node Bs are required to provide such a network structure.

Recently for fulfilling the need for improving the deployment and performance of communication systems, the concept of "plug-and-play" (e)Node Bs has been introduced. Typically, a network which is able to use "plug-and-play"

(e)Node (e)Bs, may include, in addition to Home (e)Node Bs (H(e)nodeBs), a home node B gateway, or HNB-GW (not shown in FIG. 1). A HNB Gateway (HNB-GW), which is typically installed within an operator's network may aggregate traffic from a large number of HNBs back to a core network.

Heterogenenous networks "HetNets" are means for expanding mobile network capacity. A heterogeneous network typically comprises devices using multiple radio access technologies, architectures, transmission solutions, etc. The heterogeneous networks may also create challenges due to the deployment of different wireless nodes such as macro/micro (e)NBs, pico (e)NBs, and Home (e)NBs creating a multi-layer network using a same spectrum resource. Usually, centralized network planning and optimization is not well-suited to the individualistic nature of user-deployed cells, such as femtocells. Thus cooperation between nodes in a decentralized and distributed manner may be provided. Cooperative heterogeneous networks are also known as "coHetNets".

Cognitive and re-configurable radios may be a key for obtaining a heterogeneous communication environment where mitigation techniques and cognitive signalling are used for sharing the spectrum and routing information. Spectrum sharing or flexible spectrum usage between different layers or cells of a same radio access network (RAN), between different RANs of a same operator, between different operators, etc., is recognized as a promising method to enhance the usage of available frequency domain resources. One of the basic sources for spectrum sharing gain is provided by large variations of traffic offered to a cell.

Cognitive radios are designed to efficient spectrum usage deploying so-called smart wireless devices being capable to sense and detect the environment and adapt to it thus being suitable for opportunistic spectrum usage, in which also the frequency bands not being used by their primary (usually licensed) users may be utilized by secondary users. For this purpose cognitive radios are designed to detect unused spectrum, such as spectrum holes. Alternatively, network may store information about spectrum resources that are available for a secondary usage. The information on spectrum resources may be combined with geo-location of a device, and thus available spectrum resources for the device in this particular location may be defined.

In the following, some embodiments are disclosed in further details in relation to FIG. 2. Embodiments are related to power control of a physical downlink control channel (PDCCH) of the long term evolution or the long term evolution advanced systems.

Control signalling is usually required to support the transmission of downlink and/or uplink shared channels (DL-SCH and UL-SCH) for transmitting downlink and/or uplink data (transport blocks) and/or uplink control information (UCI) as well as signalling from (e)NodeB to a user device, such as preample assignments or uplink power commands. Control information for one or more user devices may be located in a downlink control Information (DCI) message which may be transmitted via a physical downlink control channel (PDCCH). DCI messages typically comprise information on DL-SCH resource allocation (the set of resource blocks containing the DL-SCH) as well as a modulation and coding scheme for downlink user data, power control commands for physical up-link control channel (PUCCH), possible MIMO parameters, etc. The PDCCH is typically mapped up to first three OFDM symbols in the first slot of a subframe (with 1.4 MHz bandwidth up to the first four OFDM symbols). Additionally, multiple PDCCHs may be transmitted in one subframe.

For providing different coding schemes, a DCI (a scheduling grant and/or some other signaling, such as uplink control information (UCI), signalling from an (e)NodeB to a user device) may be transmitted using one or more control channel elements (CCEs) which may be combined in a predetermined manner to achieve different coding rates. When quadrature phase shift keying (QPSK) modulation is used, each CCE is designed to be equal to 9 resource element groups each group comprising 4 resource elements.

Due to the typical behaviour of LTE systems, scheduled PDCCH resources may be unequally distributed between OFDM symbols allocated for PDCCH. However, on the PDCCH, power budget may be monitored over all allocated OFDM symbols. This approach may lead to non-optimal power usage and even hardware failures, if maximum power is exceeded.

An embodiment starts in block 200. The embodiment may be carried out by a handover source node, host or server.

In block 202, usable power for each physical downlink control channel information unit is determined based on resource consumption and available power resources.

It should be appreciated that the priority of a physical downlink control channel information unit or assumed downlink channel quality conditions for a physical downlink control channel information unit transmission may be considered in power setting for an individual physical downlink control channel information unit.

A physical downlink control channel information unit may be a downlink control Information (DCI) message (mapped on a physical downlink control channel).

To form a PDCCH payload, a DCI is typically channel coded and mapped to one or more control channel elements (CCEs) according to a current PDCCH format. The coded bits are typically also scrambled, quadrature phase shift keying (QPSK) modulated (other modulation methods also possible), layer-mapped, precoded and mapped to physical resource elements (REs).

Resource consumption may be determined based on resource-element groups (REGs). A REG defines the mapping of control channels to resource elements (REs). REGs are blocks of consecutive REs within a same OFDM symbol.

Available power resources may be considered as an allowed power budget per an OFDM symbol allocated for PDCCHs.

In one embodiment, usable power is determined for a downlink control channel information unit, such as a DCI, taking into consideration resource (REG) consumption and remaining power per each orthogonal frequency division multiplexed (OFDM) symbol, typically also comprising determining power for a physical downlink control channel (PDCCH).

In another embodiment, an OFDM symbol-specific power is determined individually for each allocated downlink control information unit. In this case, individual downlink control information units may be transmitted with different power levels in each allocated OFDM symbol on a PDCCH.

Yet another embodiment is to determine a single power value for each (allocated) downlink control channel information unit taking into account minimum and/or maximum remaining power over allowed PDCCH power budgets per each OFDM symbol.

Yet another embodiment is to determine power per each OFDM symbol for each downlink control channel information unit, determine a single weighted average power over all OFDM symbol specific powers for the each downlink control channel information unit and use the obtained value as a downlink control channel information unit-specific power. Symbol specific weights used in averaging may correlate with resource consumption in the corresponding OFDM symbol. Thus higher resource consumption may lead to a higher weight.

In block 204, the usable power is adjusted orthogonal frequency division multiplexed symbol-wise in such a manner that the available power resources are not exceeded or that exceeding is given to physical downlink control channel information units according to hierarchy of needs or that the exceeding is evenly distributed to the physical downlink control channel information units.

This adjustment may be considered as the adjustment of OFDM symbol-specific power.

In one embodiment, power is adjusted on OFDM symbol basis in order that a total allowed transmission power in the symbol is not exceeded.

In another embodiment, some excess in a power limit is allowed and the excess power is distributed according to hierarchy of needs, in other words the one which needs the excess power most or benefits from it most, gets it first, and the one which needs the excess least or benefits from it least, gets it last.

In yet another embodiment, exceeding is at least substantially evenly distributed over downlink control channel information units. This may be implemented by using a balancing parameter determined per an allocated PDCCH symbol. The parameter may also be used to limit the power exceed to the amount the system is able to cope with. The balancing parameter may be obtained by simulations.

In general it can be thought that when a power budget can be maintained by allocating power OFDM symbol-wise for a PDCCH, power exceeding is possible to be kept in acceptable limits.

The embodiment ends in block 206. The embodiment is repeatable in many ways. One example is shown by arrow 208 in FIG. 2.

The steps/points, signaling messages and related functions described above in FIG. 2 are in no absolute chronological order, and some of the steps/points may be performed simultaneously or in an order differing from the given one. Other functions may also be executed between the steps/points or within the steps/points and other signaling messages sent between the illustrated messages. Some of the steps/points or part of the steps/points can also be left out or replaced by a corresponding step/point or part of the step/point.

It should be understood that conveying, transmitting and/or receiving may herein mean preparing a data conveyance, transmission and/or reception, preparing a message to be conveyed, transmitted and/or received, or physical transmission and/or reception itself, etc. on a case by case basis. The same principle may be applied to terms transmission and reception as well.

An embodiment provides an apparatus which may be any user device, relay node, node, host, webstick or server any other suitable apparatus capable to carry out processes described above in relation to FIG. 2.

Figure 3:
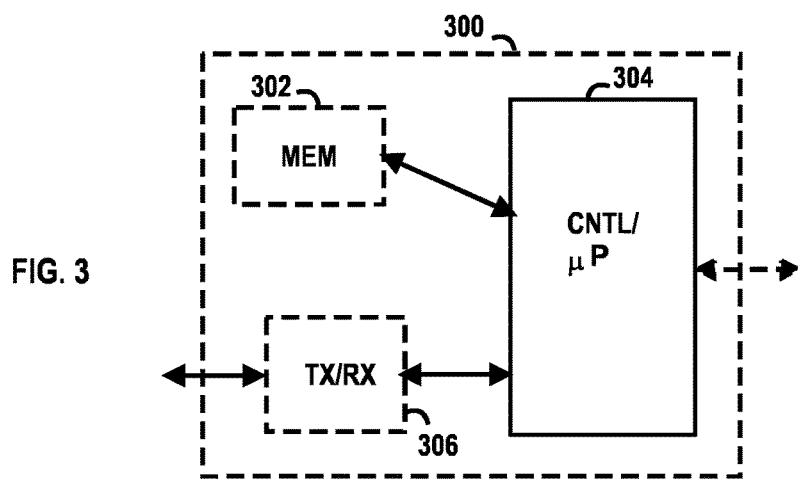
FIG. 3 illustrates examples of apparatuses.

FIG. 3 illustrates a simplified block diagram of an apparatus according to an embodiment.

Figure 2:
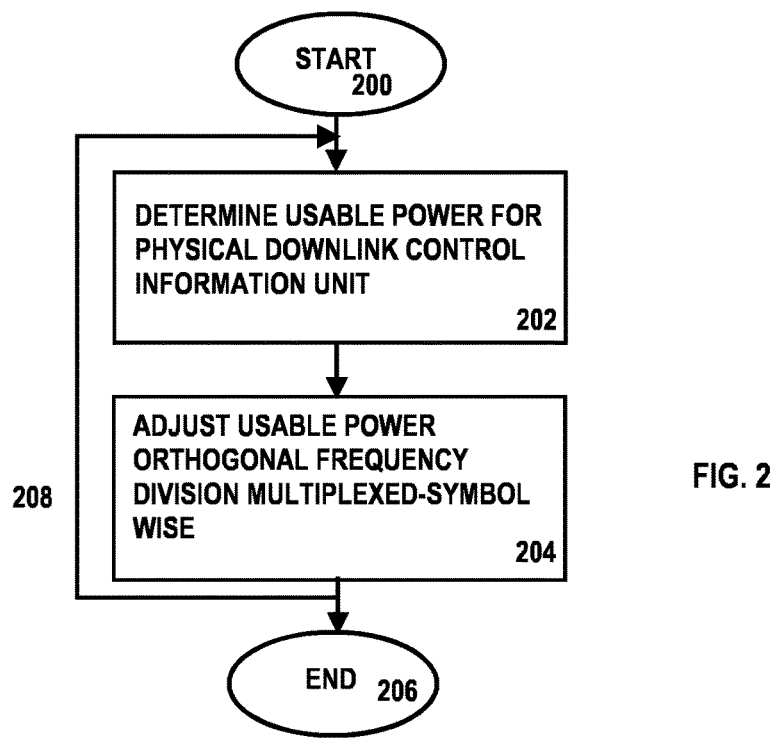
FIG. 2 is a flow chart.

As an example of an apparatus according to an embodiment, it is shown apparatus 300, including facilities in control unit 304 (including one or more processors, for example) to carry out functions of embodiments according to FIG. 2. The facilities may be software, hardware or combinations thereof as described in further detail below.

Another example of apparatus 300 may include at least one processor 304 and at least one memory 302 including a computer program code, the at least one memory and the computer program code configured to, with the at least one processor, cause the apparatus at least to: determine usable power for a physical downlink control channel information unit based on resource consumption and available power resources, and adjust the usable power orthogonal frequency division multiplexed symbol-wise in such a manner that the available power resources are not exceeded or that exceeding is given to physical downlink control channel information units according to hierarchy of needs or that the exceeding is evenly distributed over the physical downlink control channel information units.

Yet another example of an apparatus comprises means (304) for determining usable power for a physical downlink control channel information unit based on resource consumption and available power resources, and means (304) for adjusting the usable power orthogonal frequency division multiplexed symbol-wise in such a manner that the available power resources are not exceeded or that exceeding is given to physical downlink control channel information units according to hierarchy of needs or that the exceeding is evenly distributed over the physical downlink control channel information units.

Yet another example of an apparatus comprises a determiner configured to determine usable power for a physical downlink control channel information unit based on resource consumption and available power resources, and an adjuster configured to adjust the usable power orthogonal frequency division multiplexed symbol-wise in such a manner that the available power resources are not exceeded or that exceeding is given to physical downlink control channel information units according to hierarchy of needs or that the exceeding is evenly distributed over the physical downlink control channel information units.

It should be understood that the apparatuses may include or be coupled to other units or modules etc., such as those used in or for transmission and/or reception. This is depicted in FIG. 3 as optional block 306. In FIG. 3, block 306 includes parts/units/modules needed for reception and transmission, usually called a radio front end, RF-parts, radio parts, radio head, etc.

Although the apparatuses have been depicted as one entity in FIG. 3, different modules and memory may be implemented in one or more physical or logical entities.

An apparatus may in general include at least one processor, controller or a unit designed for carrying out control functions operably coupled to at least one memory unit and to various interfaces. Further, the memory units may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus. The memory may be of any type suitable for the current technical environment and it may be implemented using any suitable data storage technology, such as semiconductor-based technology, flash memory, magnetic and/or optical memory devices. The memory may be fixed or removable.

The apparatus may be at least one software application, module, or unit configured as arithmetic operation, or as a program (including an added or updated software routine), executed by at least one operation processor. Programs, also called program products or computer programs, including software routines, applets and macros, may be stored in any apparatus-readable data storage medium and they include program instructions to perform particular tasks. Computer programs may be coded by a programming language, which may be a high-level programming language, such as objective-C, C, C++, C#, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as single-chip computer element, or as a chipset, including at least a memory for providing storage capacity used for arithmetic operation and an operation processor for executing the arithmetic operation.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, other electronic units designed to perform the functions described herein, or a combination thereof. For firmware or software, the implementation may be carried out through modules of at least one chip set (e.g., procedures, functions, and so on) that perform the functions described herein. The software codes may be stored in a memory unit and executed by processors. The memory unit may be implemented within the processor or externally to the processor. In the latter case it may be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:
1. An apparatus comprising:
at least one processor and at least one memory including a computer program code, the at least one memory and the computer program code configured to, with the at least one processor, cause the apparatus at least to:
determine an amount of usable power for a physical downlink control channel information unit based on resource consumption and available power resources, and
adjust the usable power orthogonal frequency division multiplexed symbol-wise in such a manner that the available power resources are not exceeded,
wherein available spectrum is divided into a plurality of orthogonal sub-carriers and data is transmitted in parallel streams over the plurality of orthogonal sub-carriers, wherein a symbol is comprised of a combination of signals transmitted on each of the plurality of orthogonal frequency division multiplexed sub-carriers, and adjusting the usable power orthogonal frequency division multiplexed symbol-wise adjusts the power of a given symbol on a symbol-specific basis over each individual one of the plurality of sub-carriers so that a total allowed transmission power in the given symbol is not exceeded,
or if available power resources are exceeded, excess power is given to physical downlink control channel information units according to a hierarchy of needs,
or if available power resources are exceeded, excess power is evenly distributed over the physical downlink control channel information units.

2. The apparatus of claim 1, wherein the physical downlink control channel information (PDCCH) unit is a downlink control Information (DCI) message.

3. The apparatus of claim 1, wherein the resource consumption is determined based on resource-element groups (REGs) and the available power resources are determined based on an allowed power budget per an orthogonal frequency division multiplexed (OFDM) symbol allocated for physical downlink control channel usage.

4. The apparatus of claim 1, wherein the usable power is determined for the downlink control channel information unit taking into consideration remaining power per each orthogonal frequency division multiplexed symbol.

5. The apparatus of claim 1, wherein the usable power is determined orthogonal frequency division multiplexed symbol-specifically individually for the downlink control channel information unit.

6. The apparatus of claim 1, wherein the usable power is determined as a single power value for the allocated downlink control channel information unit taking into account minimum and/or maximum remaining power over allowed physical downlink control channel power budgets per each orthogonal frequency division multiplexed symbol.

7. The apparatus of claim 1, wherein the usable power is determined per each orthogonal frequency division multiplexed symbol for the downlink control channel information unit and by determining a single weighted average power over all orthogonal frequency division multiplexed symbol specific powers for the downlink control channel information unit.

8. A method comprising:
   determining an amount of usable power for a physical downlink control channel information unit based on resource consumption and available power resources, and
   adjusting the usable power orthogonal frequency division multiplexed symbol-wise in such a manner that the available power resources are not exceeded,
   wherein available spectrum is divided into a plurality of orthogonal sub-carriers and data is transmitted in parallel streams over the plurality of orthogonal sub-carriers, wherein a symbol is comprised of a combination of signals transmitted on each of the plurality of orthogonal frequency division multiplexed sub-carriers, and adjusting the usable power orthogonal frequency division multiplexed symbol-wise adjusts the power of a given symbol on a symbol-specific basis over each individual one of the plurality of sub-carriers so that a total allowed transmission power in the given symbol is not exceeded,
   or if available power resources are exceeded, excess power is given to physical downlink control channel information units according to hierarchy of needs,
   or if available power resources are exceeded, excess power is evenly distributed over the physical downlink control channel information units.

9. The method of claim 8, wherein the physical downlink control channel information (PDCCH) unit is a downlink control Information (DCI) message.

10. The method of claim 8, wherein the resource consumption is determined based on resource-element groups (REGs) and the available power resources are determined based on an allowed power budget per an orthogonal frequency division multiplexed (OFDM) symbol allocated for physical down-link control channel usage.

11. The method of claim 8, wherein the usable power is determined for the downlink control channel information unit taking into consideration remaining power per each orthogonal frequency division multiplexed symbol.

12. The method of claim 8, wherein the usable power is determined orthogonal frequency division multiplexed symbol-specifically individually for the downlink control channel information unit.

13. The method of claim 8, wherein the usable power is determined as a single power value for the allocated downlink control channel information unit taking into account minimum and/or maximum remaining power over allowed physical downlink control channel power budgets per each orthogonal frequency division multiplexed symbol.

14. The method of claim 8, wherein the usable power is determined per each orthogonal frequency division multiplexed symbol for the downlink control channel information unit and by determining a single weighted average power over all orthogonal frequency division multiplexed symbol specific powers for the downlink control channel information unit.

15. A computer program embodied on a computer-readable storage medium, the computer program comprising program code for controlling a process to execute a process, the process comprising:
   determining usable power for a physical downlink control channel information unit based on resource consumption and available power resources, and
   adjusting the usable power orthogonal frequency division multiplexed symbol-wise in such a manner that the available power resources are not exceeded,
   wherein available spectrum is divided into a plurality of orthogonal sub-carriers and data is transmitted in parallel streams over the plurality of orthogonal sub-carriers, wherein a symbol is comprised of a combination of signals transmitted on each of the plurality of orthogonal frequency division multiplexed sub-carriers, and adjusting the usable power orthogonal frequency division multiplexed symbol-wise adjusts the power of a given symbol on a symbol-specific basis over each individual one of the plurality of sub-carriers so that a total allowed transmission power in the given symbol is not exceeded,
   or if available power resources are exceeded, excess power is given to physical downlink control channel information units according to hierarchy of needs,
   or if available power resources are exceeded, excess power is evenly distributed over the physical downlink control channel information units.

16. The computer program of claim 15, wherein the resource consumption is determined based on resource-element groups (REGs) and the available power resources are determined based on an allowed power budget per an orthogonal frequency division multiplexed (OFDM) symbol allocated for physical downlink control channel usage.

17. The computer program of claim 15, wherein the usable power is determined for the downlink control channel information unit taking into consideration remaining power per each orthogonal frequency division multiplexed symbol.

18. The computer program of claim 15, wherein the usable power is determined orthogonal frequency division multiplexed symbol-specifically individually for the downlink control channel information unit.

19. The computer program of claim 15, wherein the usable power is determined as a single power value for the allocated downlink control channel information unit taking into account minimum and/or maximum remaining power over allowed physical downlink control channel power budgets per each orthogonal frequency division multiplexed symbol.

20. The computer program of claim 15, wherein the usable power is determined per each orthogonal frequency division multiplexed symbol for the downlink control channel information unit and by determining a single weighted average power over all orthogonal frequency division multiplexed symbol specific powers for the downlink control channel information unit.

* * * * *